United States Patent
Zhou et al.

(10) Patent No.: US 12,072,893 B2
(45) Date of Patent: Aug. 27, 2024

(54) SYSTEM AND METHOD FOR HIERARCHICAL DATABASE OPERATION ACCELERATOR

(71) Applicant: HEFEI SWAYCHIP INFORMATION TECHNOLOGY INC., Anhui (CN)

(72) Inventors: Min Zhou, Beijing (CN); Junling Xiang, Beijing (CN); Ruimin Liu, Beijing (CN)

(73) Assignee: HEFEI SWAYCHIP INFORMATION TECHNOLOGY INC., Hefei (CN)

( * ) Notice: Subject to any disclaimer, the term of this patent is extended or adjusted under 35 U.S.C. 154(b) by 0 days.

(21) Appl. No.: 18/280,717

(22) PCT Filed: Dec. 1, 2021

(86) PCT No.: PCT/CN2021/134699
§ 371 (c)(1),
(2) Date: Sep. 7, 2023

(87) PCT Pub. No.: WO2023/015780
PCT Pub. Date: Feb. 16, 2023

(65) Prior Publication Data
US 2024/0037104 A1 Feb. 1, 2024

(30) Foreign Application Priority Data
Aug. 9, 2021 (CN) .......................... 202110909662.0

(51) Int. Cl.
*G06F 16/245* (2019.01)
*G06F 16/2453* (2019.01)
*G06F 16/2455* (2019.01)

(52) U.S. Cl.
CPC .. *G06F 16/24569* (2019.01); *G06F 16/24542* (2019.01); *G06F 16/24552* (2019.01)

(58) Field of Classification Search
None
See application file for complete search history.

(56) References Cited

U.S. PATENT DOCUMENTS 9,652,496 B1 * 5/2017 Antova ............... G06F 16/2456
2002/0198872 A1 * 12/2002 MacNicol ......... G06F 16/24532
(Continued)

FOREIGN PATENT DOCUMENTS

CN 105183683 A 12/2015
CN 105868388 A 8/2016
(Continued)

OTHER PUBLICATIONS

International Search Report issued May 7, 2022 for PCT/CN2021/134699.
(Continued)

*Primary Examiner* — Son T Hoang
(74) *Attorney, Agent, or Firm* — Schmeiser, Olsen & Watts, LLP

(57) ABSTRACT

A system and method for hierarchical database operation accelerator for scaling a single node database with a plurality of accelerator cards is provided, including: a host, receiving a query plan, generating a corresponding query operation and distributing them, receiving and processing aggregated execution results; a hierarchy accelerator module, which is connected to the host, receiving the query operation distributed and returning the aggregated execution results; the hierarchy accelerator module comprises a master accelerator card and at least one slave accelerator card, the slave accelerator card returns the execution results to the master accelerator card, by the master accelerator card completes the subsequent query operation which is aggregated and assigned by the execution results, returning the aggregated execution results to the host; the accelerator system having a multi-level storage architecture of accel- (Continued)

erator chip on-chip cache, the accelerator card memory, the accelerator card storage, and the host-side storage.

10 Claims, 10 Drawing Sheets

(56) References Cited

U.S. PATENT DOCUMENTS

| | | | |
|---|---|---|---|
| 2009/0019007 A1* | 1/2009 | Niina | G06F 16/2471 |
| 2015/0379078 A1* | 12/2015 | Welton | G06F 16/24524 |
| | | | 707/718 |
| 2016/0042033 A1* | 2/2016 | Choi | G06F 16/24542 |
| | | | 707/718 |
| 2016/0103897 A1 | 4/2016 | Nysewander | |
| 2016/0205140 A1* | 7/2016 | Verma | G06F 16/27 |
| 2017/0177665 A1* | 6/2017 | Chang | G06F 16/2471 |
| 2017/0286142 A1 | 10/2017 | Palermo | |
| 2018/0268000 A1* | 9/2018 | McManus | G06F 16/24561 |
| 2019/0005407 A1 | 1/2019 | Harris | |
| 2019/0228009 A1 | 7/2019 | Nakagawa | |
| 2020/0004651 A1* | 1/2020 | Hamel | G06F 16/24532 |
| 2020/0065067 A1* | 2/2020 | Harada | G06F 16/2471 |
| 2021/0103592 A1* | 4/2021 | Bishnoi | G06F 16/2471 |
| 2022/0277009 A1* | 9/2022 | De Nijs | G06F 16/2282 |

FOREIGN PATENT DOCUMENTS

| | | |
|---|---|---|
| CN | 205983466 U | 2/2017 |
| CN | 106844703 A | 6/2017 |
| CN | 108319563 A | 7/2018 |
| CN | 109739784 A | 5/2019 |
| CN | 110071933 A | 7/2019 |
| CN | 110347344 A | 10/2019 |
| CN | 110851378 A | 2/2020 |
| CN | 111209289 A | 5/2020 |
| CN | 111625558 A | 9/2020 |
| CN | 112631778 A | 4/2021 |
| CN | 112835743 A | 5/2021 |
| CN | 113168409 A | 7/2021 |
| CN | 113535745 A | 10/2021 |

OTHER PUBLICATIONS

Ke Yang, etc. Application of graphics processor in database technology. Journal of Zhejiang University (Engineering Edition). 2009, (vol. 08).

Yansong Zhang, etc. Concurrent memory OLAP query optimization techniques. Computer Research and Development. 2016, (vol. 12).

Qi Zhang, etc. An ontology-driven knowledge base based scientific database architecture. Computer Research and Development. 2008.

* cited by examiner

QUERY PLAN
────────────────────────────────────────────────────────────
Finalize GroupAggregate (cost=100533.58..101385.70 rows=6145 width=98)
  Group Key: n1.n_name, n2 . n_name, (date _ part( ' year ' : :  text , (lineitem.l_shipdate): :timestamp without time zone))
    -> Gather Merge(cost=100533.58..101214.16 rows=5120 width=98)
      Workers planned: 2
      -> Partial GroupAggregate(cost=99533.56..99623.16 rows=2560 width=98)
        Group Key: n1.n_name, n2n_name, (date_part('year' : :  text, (lineitem.l_shipdate): :timestamp without time zone))
          -> Sort(cost=99533.56..99539.96 rows=2560 width=78)
            Sort Key: n1.n_name, n2 . n_name, (date_ part('year' : :  text, (lineitem.l_shipdate): :timestamp without time zone))
              -> Hash Join (cost=4830.31..99388.64 rows=2560 width=78)
                Hash Cond: (lineitem.l_ suppkey = supplier.s_suppkey)
                Join Filter: (((n1.n_name= 'GERMANY': : bpchar) AND(n2n_name = 'EGYPT'::bpchar) )OR(n1.n_name = 'E G Y P T':: bpchar) AND(n2.n_name = 'GERMANY'::bpchar)))
                  -> Nested Loop(cost=4466.21..98682.52 rows=61541 width=49)
                    -> Parallel Hash Join (cost=4465.77..39362.86 rows=50000 width=33)
                      Hash Cond: (orders.o_custkey = customer.c_custkey)
                        -> Parallel Seq Scan on orders (cost=0.00..32345.00 rows=625000 width=8)
                        -> Parallel Hash (cost=4403. 27. .4403. 27 rows=5000 width=33)
                          -> Hash Join (cost=1. 40.. 4403.27 rows=5000 width=3)
                            Hash Cond: (customer.c_nationkey = n2.n_nationkey)
                              - > Parallel Seg Scan on customer  (cost=0.00. . 4210.00 rows=62500 width=8)
                              -> Hash (cost=1.38..1.38 rows=2 width=33)
                                -> Seg Scan on nation n2 (cost=0.00..1.38 rows=2 width=33)
                                  Filter: ((n_ name= 'EGYPT' : : bpchar) OR  (n _ Name = 'GERMANY'::bpchar))
                    - > Index Scan using lineitem_pkey on lineitem (cost=0.43.. 1.14 rows=5 width=24)
                      Index Cond: (L_orderkey = orders.o_Orderkey)
                      Filter:(( l_shipdate >= '1995-01-01'::date) AND (l_Shipdate <= '1996-12-31'::date))
                -> Hash(cost=354.10..354.10 rows=800 wdth=33)
                  -> Hash Join(cost=1.40..354.10 rows=800 width=33)
                    Hash Cond: (supplier.s_nationkey =n1.n_nationkey)
                    -> Seq Scan on supplier (cost=0.00..322.00 rows=10000 width=8)
                    -> Hash (cost=1.38..1.38 rows=2 width=33)
                      -> Seq Scan on nation n1 (cost=0.00..1.38 rows=2 width=33)
                        Filter: ((n_name = 'GERMANY '::bpchar) OR (n_name = 'EGYPT'::bpchar))
(32 rows)

FIG. 9

QUERY PLAN
-------------------------------------------------------------------------

GroupAGgregate (cost=164597.42.. 164710.26 rows=5 width=24)
  Output: orders.o_orderpriority, count(*)
  Group Key: orders.o_orderpriority
  -> Sort(cost=164597.42..164635.01 rows=15039 width=16)
     Output: orders.o_orderpriority
     Sort Key: orders.o_orderpriority
     - > Nested Loop Semi Join (cost=0.43. . 163553.98 rows=15039 width=16)
        Output: orders.o_orderpriority
        - > Seq Scan on public orders (cost=0.00.. 48595 . 00 rows=58570 width=20)
           Output: orders.o_orderkey, orders.o_ custkey, orders.o_ orderstatus, orders . o _totalprice, orders . o_orderdate, orders.o_orderpriority , orders.o_clerk, orders.o_shippriority, orders.o_comment
           Filter: ((orders.o _ orderdate >= a 1993-10-01Ď : : date) AND (orders.o _ Orderdate < a 1994-01-01 00: 00: 00Ď : : timestamp without time zone))
        ->Index Scan using lineitem_pkey on public.lineitem (cost=0.43..7.02 rows=5 width=4)
           Output: lineitem.l_orderkey, lineitem.l_partkey, lineitem.l_suppkey, lineitem. l _ linenumber, lineitem. l _ quantity, lineitem. l _ extendedprice,lineitem. l _ discount, ineitem . l _ tax , lineitem. l _ r eturnflag, ineitem . l _ nestatus , ineitem . l _ shipdate, lineitem . l _ commitdate, lineite . l _ receiptdate, lineitem. l _ shipinstruct, lineitem.l_shipmode, lineitem.l_Comment
           Index Cond: (lineitem.l_orderkey= orders.o_Orderkey)
           Filter: (lineitem.l_commitdate < lineitem.l_receiptdate)
(15 rows)

FIG. 12

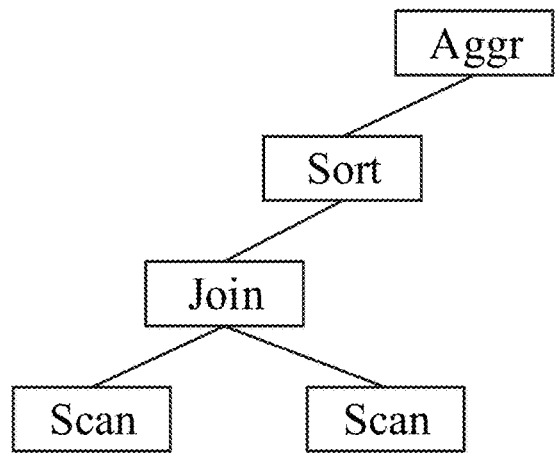

FIG. 13

QUERY PLAN
---------------------------------------------------------------

Aggregate (cost = 216137.52..216137.53 rows = 1 width = 32 )
  Output: ((100.00 * sum ( CASE WHEN (( part.p_tYpe)::text ~~ a PROMO%Ď ::text) THEN ( lineitem.l_extendedprce * (a 1Ď ::numerc − l Ineitem. l _ discount) ) ELSE a 0Ď : : numeric END ) ) / sum ((lineitem.l_extendedprice * (a 1Ď ::numerc − lIneitem.l_discount))))
  -> Hash Join (cost = 9965.00..214800.74 rows = 76387 width = 33)
     Output: part.p_type, lineitem.l_extendedprice, lineitem.l_discount
     Inner Unique: true
     Hash Cond: ( lineitem.l_partkey = part.p_partkey)
     -> Seq Scan on public.lineitem ( cost = 0.00..202521.22 rows = 76387 width = 16 )
        Output: lineitem. l _ extendedprice, lineitem. l _ discount, lineitem.l_partkey
        Filter: ( lineitem. l _ shipdate > = a 1993-09-01Ď : : date ) AND ( lineitem.l_ shipdate < a 1993-10-01 00 :00 : 00Ď ::timestamp without time zone ))
     -> Hash (cost = 6097.00..6097.00 rows = 200000 width = 25)
        Output: part.p_type , part.p_Partkey
        -> Seg Scan on public.part (cost = 0.00..6097.00 rows = 200000 width = 25)
           Output : part.p_type , part.p_partkey
( 13 rows )

FIG. 14

SYSTEM AND METHOD FOR HIERARCHICAL DATABASE OPERATION ACCELERATOR

CROSS-REFERENCE TO RELATED APPLICATIONS

This application claims priority to PCT Application No. PCT/CN2021/134699, having a filing date of Dec. 1, 2021, which claims priority to CN Application No. 202110909662.0, having a filing date of Aug. 9, 2021, the entire contents of both of which are hereby incorporated by reference.

FIELD OF TECHNOLOGY

The following refers to the field of database technology, and more specifically, to a system and method for hierarchical database operation accelerator.

BACKGROUND

In the database application area, facing the performance challenges of massive data processing and analysis, heterogeneous computing solutions are often used to meet the performance requirements. The usual hardware accelerator solution is to extend a PCIe (Peripheral Component Interconnect Express) interface accelerator card on the server where the database software is deployed, and achieve the database processing performance improvement by offloading some database operations to the accelerator card for execution. How to use hardware to improve database processing performance as much as possible has become an important technical research point in the database field.

Database query operation using hardware accelerator gain significant performance improvements over software, but a single accelerator card due to hardware conditions such as FPGA (Field Programmable Gate Array) resources, cache capacity, power and heat consumption limitation, etc., its performance gains exist in the upper limit. When the single node processing performance needs to be further improved and needs to carry more database query operations offloaded to the accelerator card for execution, expanding multiple cards becomes a natural choice, but how to achieve multicard expansion of a single node is an urgent problem to be solved.

One option in the conventional art is to retrieve cost information for the processing configuration of each of the plurality of available gas pedals, and offload one or more query operations to at least one of a plurality of gas pedals based on cost information and analysis of the query. However, this scheme storage units are all on the host (i.e., mainframe) side, while the execution results of each accelerator need to be aggregated to the host for processing, thus creating a performance bottleneck in the accelerator of the multi-accelerator card system.

Another option in the conventional art is a single node vertical expansion node with a plurality of hardware accelerators connected through a PCIe converter and a storage device connected, distributing the query slice processed by the host to at least one accelerator for execution and return the result of that slice by slicing the query, however, the single node vertical expansion node is only a single storage unit, while each accelerator executes each query slice, and the execution results need to be aggregated to the host for processing, thus affecting the further improvement of the accelerator performance of the multi-accelerator card system.

Therefore, how to further improve the processing performance of single node database systems including plurality of accelerator cards and improve the efficiency of data query is a pressing technical problem to be solved.

SUMMARY

An aspect relates to a system for hierarchical database operation accelerator for solving the technical problem of performance bottlenecks in single node database systems including plurality of accelerator cards in the conventional art.

The system includes:
a host, receiving a query plan, generating a corresponding query operation and distributing them according to the query plan, the host also receiving and processing aggregated execution results;
a hierarchy accelerator module, which is connected to the host, receiving the query operation distributed by the host and returning the aggregated execution results;
the hierarchy accelerator module comprises a master accelerator card and at least one slave accelerator card, the master accelerator card and the slave accelerator card are interconnected to execute the assigned query operation and generate execution results; wherein the slave accelerator card returns the execution results to the master accelerator card, by the master accelerator card completes the subsequent query operation which is aggregated and assigned by the execution results, returning the aggregated execution results to the host.

In some embodiments of the present application, the host, the master accelerator card and the slave accelerator cards are provided with storage units for storing data, forming a multi-level storage architecture of accelerator chip on-chip cache, accelerator card memory, accelerator card storage, and host-side storage;
the host distributes the query operation corresponding to the query plan to each the accelerator card based on data distribution information and execution capability information of each accelerator card, the data distribution information being determined based on the data distribution status between each the storage unit.

In some embodiments of the present application, data is transferred between the accelerator chip on-chip cache, the accelerator card memory, the accelerator card storage, and the host-side storage in accordance with predetermined cache rules.

In some embodiments of the present application, the individual slave accelerator cards send their own notification information to the master accelerator card at a predetermined periodicity, the master accelerator card updating the data distribution among the accelerator cards based on the notification information;
wherein, the notification information includes the remaining capacity of the accelerator card memory and the content of the stored data, as well as the hotness and correlation of the respective node data blocks recorded by each the slave accelerator card.

In some embodiments of the present application, the master accelerator card is selected from each the accelerator card according to predetermined rules, the master accelerator card, the slave accelerator card and the host being connected to each other according to predetermined physical interface specifications.

In some embodiments of the present application, each the accelerator card performs each the query operation based on data received from other accelerator cards, data in the accelerator card's own memory, data in the memory pool, data in the accelerator card's own memory;

each the accelerator card saving, sending to the other accelerator cards, and returning to the master accelerator card, some or all of the execution results of each the query operation; wherein, the memory pool is generated from each the accelerator card memory and the host memory of the host in accordance with a cache coherency protocol.

In some embodiments of the present application, each the master accelerator card and the slave accelerator card are connected to each other via a data bus and/or a network interface, each the master accelerator card and slave accelerator card having the capability to encrypt and/or compress, decrypt and/or decompress data.

Accordingly, embodiments of the present invention also present a method for hierarchical database operation accelerator, characterized in that, the method comprises:

when the query operation corresponding to the query plan is received from the host, executing each the query operation based on a plurality of accelerator cards in the hierarchy accelerator module, the plurality of accelerator cards in the hierarchy accelerator module comprise a master accelerator card and at least one slave accelerator card;

returning the aggregated execution results to the host based on the master accelerator card to enable the host to determine result data corresponding to a query request based on the aggregated execution results;

wherein, the query plan is generated based on the query request, the query operation comprises a master query operation performed by the master accelerator card and a slave query operation performed by the slave accelerator card, the aggregated execution results being the result of the master accelerator card performing the master query operation based on the execution results of each the slave query operation.

In some embodiments of the present application, each the query operation is executed based on a plurality of accelerator cards in the hierarchy accelerator module, specifically:

executing each the query operation based on each the accelerator card according to data received from other accelerator cards, data in the accelerator card's own memory, data in a memory pool, data in the accelerator card's own storage;

saving, sending to other slave accelerator cards, returning to the master accelerator card, based on each the accelerator card, some or all of the execution results of each the query operation;

wherein, the memory pool is generated by each the master accelerator card, the memory of the slave accelerator cards and the host memory of the host in accordance with a cache coherency protocol.

In some embodiments of the present application, the method further comprises:

sending its own notification information to the master accelerator card at a predetermined periodicity based on each the slave accelerator card; and, updating the data distribution among each the accelerator cards according to the notification information based on the master accelerator card;

wherein, the notification information includes the remaining capacity and the content of the stored data of the accelerator card storage, and the hotness and correlation of the respective node data blocks recorded by each the slave accelerator card.

The system for hierarchical database operation accelerator of embodiments of the present invention accelerate the query operation of the database hierarchically through the above technical solution, and purposely builds a multi-level storage architecture of accelerator chip on-chip cache, accelerator card memory, accelerator card storage, and host-side storage, thus effectively avoiding the aggregation of execution results to the host for processing, eliminating performance bottlenecks, giving full play to the acceleration capability of multiple accelerator cards, further improving the processing performance of single node database systems including multiple accelerator cards, and improving data query efficiency.

BRIEF DESCRIPTION

Some of the embodiments will be described in detail, with references to the following Figures, wherein like designations denote like members, wherein:

FIG. 9 illustrates a schematic diagram of the Q7 execution plan output by PostgreSQL upon receipt of a query operation from a client by the host in an embodiment of the present invention;

FIG. 12 illustrates a schematic diagram of the Q4 execution plan output by PostgreSQL in an embodiment of the present invention when the host receives query operations from two clients at the same time;

FIG. 13 illustrates a schematic diagram of the execution plan tree corresponding to FIG. 12;

FIG. 14 illustrates a schematic diagram of the Q14 execution plan output by PostgreSQL in embodiments of the present invention when the host receives query operations from two clients at the same time.

DETAILED DESCRIPTION

The following will be a clear and complete description of the technical solutions in the embodiments of this application in conjunction with the accompanying drawings in the embodiments of this application. Obviously, the described embodiments are only a part of the embodiments of this application, and not all of them. Based on the embodiments in the present application, all other embodiments obtained by a person of ordinary skill in the art without making creative labor fall within the scope of protection of the present application.

Figure 1:
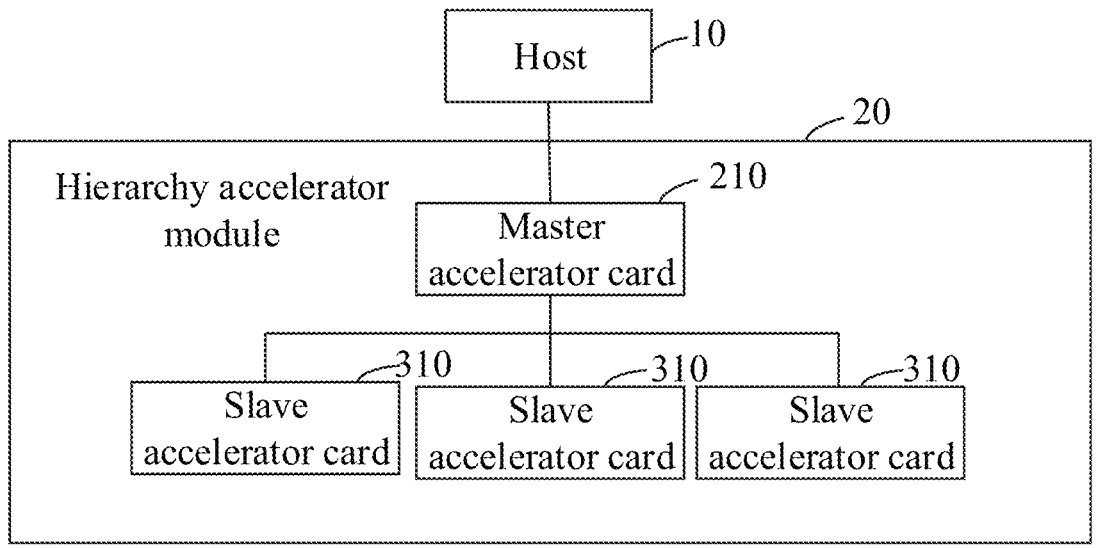
FIG. 1 illustrates an architectural view of a system for hierarchical database operation accelerator proposed by an embodiment of the present invention.

Embodiments of the present application provide a system for hierarchical database operation accelerator, as shown in FIG. 1, comprising:

a host 10, receiving a query plan, generating a corresponding query operation and distributing them according to the query plan, the host 10 also receiving and processing aggregated execution results;

a hierarchy accelerator module 20, which is connected to the host 10, receiving the query operation distributed by the host 10 and returning the aggregated execution results;

the hierarchy accelerator module 20 comprises a master accelerator card 210 and at least one slave accelerator card 310, the master accelerator card 210 and the slave accelerator card 310 are interconnected to execute the assigned query operation and generate execution results; wherein the slave accelerator card 310 returns the execution results to the master accelerator card 210, by the master accelerator card 210 completes the subsequent query operation which is aggregated and assigned by the execution results, returning the aggregated execution results to the host 10.

In this embodiment, the host 10 is connected to the hierarchy accelerator module 20 that is accelerated based on the accelerator card, which includes a master accelerator card 210 and at least one slave accelerator card 310. The accelerator card may be an external hardware accelerator, a device that implements acceleration based on hardware, including a GPU (Graphics Processing Unit), or an FPGA, or an ASIC (Application Specific Integrated Circuit).

When the host 10 receives a query request, the host 10 distributes the corresponding query plan to each the accelerator card to cause each accelerator card to perform a query operation, which may be one or more execution plan trees generated based on the optimization engine, where each accelerator card includes a master accelerator card 210 and each slave accelerator card 310, and the query operation includes a master query operation performed by the master accelerator card 210 and a slave query operation performed by the slave accelerator card 310. Each slave accelerator card 310 executes each slave query operation and sends the corresponding execution result to the master accelerator card 210, the master accelerator card 210 aggregates the execution result of each slave accelerator card 310 and executes the master query operation according to the result of the data aggregation, and then the master accelerator card 210 sends the result of executing the master query operation as the aggregated execution result to the host 10, and the host 10 according to this aggregated execution result to determine the result data corresponding to the query request, and then the result data can be returned to the user or client.

In order to reduce the time because of accessing data in external storage units and to improve the speed of database operation, in some embodiments of the present application, the host 10 and each the accelerator card are provided with storage units for storing data, forming a multi-level storage architecture of accelerator chip on-chip cache, accelerator card memory, accelerator card storage, and host-side storage.

Wherein, if there is already generated database data, it is loaded in advance from the host 10 storage and stored in the accelerator card storage; if it starts from an initial empty database, it is stored in the accelerator card storage according to the data distribution rules defined by the host when the data is generated.

Figure 2:
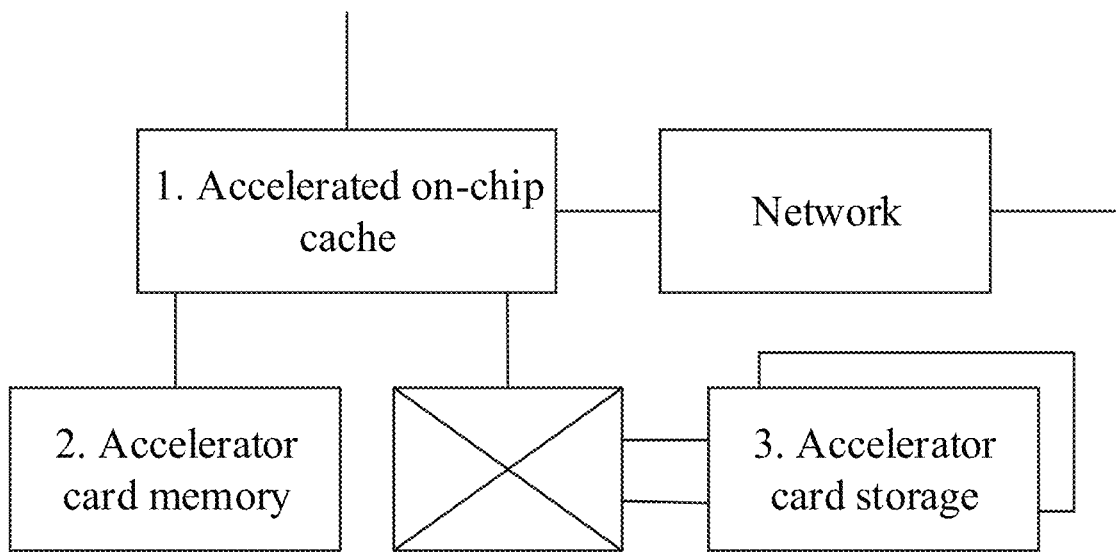
FIG. 2 illustrates a schematic diagram of the storage architecture of the accelerator card in an embodiment of the present invention.
Figure 3:
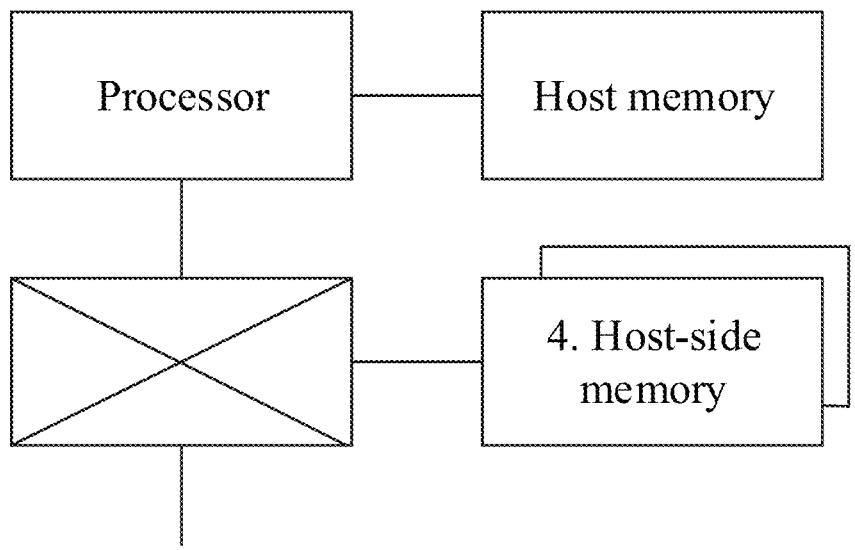
FIG. 3 illustrates a schematic diagram of the storage architecture of the host in an embodiment of the present invention.

In the specific application scenario of this application, a schematic diagram of the storage architecture of the accelerator card is shown in FIG. 2, and a schematic diagram of the storage architecture of the host as shown in FIG. 3. As shown in FIG. 2, the storage architecture of the accelerator card includes, 1, the multi-level storage architecture of accelerator chip on-chip cache, 2, the accelerator card memory, and 3, the accelerator card storage; as shown in FIG. 3, the storage architecture of the host includes the host memory and 4, the host-side storage.

Wherein, the accelerator card storage may include HDD (Hard Disk Drives) or SSD (Solid State Drives), and the accelerator card memory includes DRAM (Dynamic Random Access Memory), SRAM (Static Random Access Memory), SDRAM (Synchronous Dynamic Random Access Memory), non-volatile storage, etc.

The host pre-loads the data stored in the host-side storage into each accelerator card storage according to a predetermined data distribution rule, which may specifically be metadata characterizing the distribution of data among the storage units. When the host receives the query request, it determines the data distribution information based on the data distribution status between each the storage unit, and distributes the query plan to each the accelerator card based on the data distribution information and the execution capability information of each the accelerator card. Wherein, the execution capability information is determined based on operations that can be performed by each the accelerator card, which may include scanning, joining, sorting, and aggregation operations.

In order to improve the efficiency of the query, in some embodiments of the present application, data is transferred between the accelerator chip on-chip cache, the accelerator card memory, the accelerator card storage, and the host-side storage in accordance with predetermined cache rules.

In this embodiment, the data may be swapped in and out of the preset cache rules based on the preset cache rules before all levels of storage may be LRU (Least Recently Used) rules.

In order to improve the efficiency of the query, in some embodiments of the present application, the individual slave accelerator cards send their own notification information to the master accelerator card at a predetermined periodicity, the master accelerator card updating the data distribution among the accelerator cards based on the notification information.

In this embodiment, the notification information includes the remaining capacity of the accelerator card memory and the content of the stored data, as well as the hotness and correlation of the respective node data blocks recorded by each the slave accelerator card, the master accelerator card updates the data distribution among the respective the accelerator cards based on the notification information. Wherein, the preset period is set by the host, the hotness of the respective node data blocks is determined based on the access frequency, and the correlation of the respective node data blocks is determined based on the inter-table Join operation.

Optionally, static data is designated or randomly stored by the host into the accelerator card storage of any accelerator card, and in some embodiments, each accelerator card storage is pooled to form the same storage, with neither the host nor each accelerator card sensing the specific location where the data is stored.

In order to improve the efficiency of the query, in some embodiments of the present application, the master accelerator card distributes each remaining capacity equally among the accelerator card storages based on load balancing, or distributes hot data above a preset access frequency equally among the accelerator card storages based on load balancing, or stores data with a higher correlation than a preset value in the same accelerator card storage.

In the specific application scenario of this application, a data refresh module of the master accelerator card acquires the notification information, and based on a data refresh module to control the data distribution among the accelerator cards, which can be a processor that can execute instructions integrated in the master accelerator card, including ARM (Advanced RISC Machines), or a fifth generation streamlined instruction set processor RISC-V and other microprocessors, or it can be a functional module implemented by FPGA, so that when each accelerator card performs query operations, the amount of data flow between each accelerator card is as small as possible, which improves the data query efficiency.

In order to improve the compatibility of the system, in some embodiments of the present application, the master accelerator card is selected from each the accelerator card according to predetermined rules, the master accelerator card, the slave accelerator card and the host being connected to each other according to predetermined physical interface specifications.

In this embodiment, the master accelerator card and the slave accelerator card may be the accelerator cards with the same internal hardware structure, which may implement the same functions; or may be the accelerator cards with different internal hardware structures, which may implement different functions; and each the slave accelerator card may also be the accelerator cards with different internal hardware structures, which may implement different functions. The master accelerator card is selected from each accelerator card according to predetermined rules, in some embodiments of the present application, the master accelerator card is the first accelerator card scanned out on the PCIe bus, or the master accelerator card is the accelerator card designated by the host according to the identification (such as physical mac address) of each the accelerator card, or the master accelerator card is determined according to a hardware dipswitch, such as the accelerator card with the dipswitch toggled to 1 is the master accelerator card. In the event of a failure of the current master accelerator card, a predetermined successor accelerator card takes over the current master accelerator card.

Figure 4A:
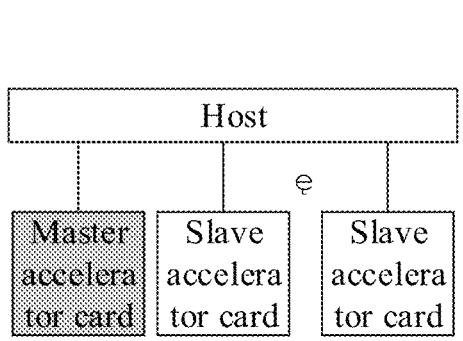
FIG. 4a illustrates a schematic diagram of the physical connection of the accelerator card to the host in embodiments of the present invention.
Figure 4B:
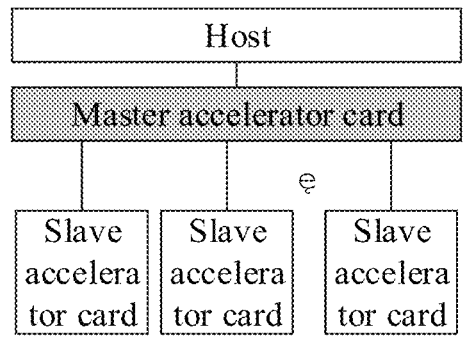
FIG. 4b illustrates a schematic diagram of the physical connection of the accelerator card to the host in embodiments of the present invention.
Figure 4C:
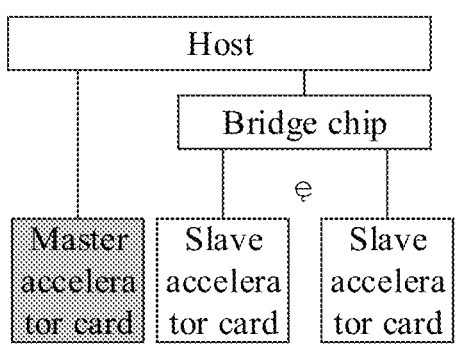
FIG. 4c illustrates a schematic diagram of the physical connection of the accelerator card to the host in embodiments of the present invention.
Figure 4D:
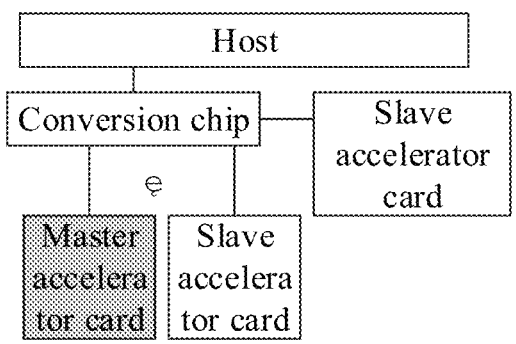
FIG. 4d illustrates a schematic diagram of the physical connection of the accelerator card to the host in embodiments of the present invention.

The connection between each the accelerator card (such as the master accelerator card and each the slave accelerator card) and the host is made according to the preset physical interface specification. In the specific application scenario of this application, four types (a), (b), (c), and (d) of connections between each the accelerator card and the host are illustrated in FIGS. 4a-d, as shown in FIG. 4 (a), each the accelerator card can be directly connected to the host and downlinks the rest of the slave accelerator cards; as shown in FIG. 4 (b), the master accelerator card is directly connected to the host; As shown in FIG. 4(c), the master accelerator card is directly connected to the host, and each the slave accelerator card can be connected to the host after connecting to the bridge chip; as shown in FIG. 4(d), each the accelerator card can be connected to the host via the PCIe conversion chip. Alternatively, each the accelerator card can also be on the same PCIe bus, and connecting to the host via PCIe bus.

In order to improve the reliability of the system, in some embodiments of the present application, each the accelerator card performs each the query operation based on data received from other accelerator cards, data in the accelerator card's own memory, data in the memory pool, data in the accelerator card's own memory;

each the accelerator card saving, sending to the other accelerator cards, and returning to the master accelerator card, some or all of the execution results of each the query operation.

In this embodiment, each the accelerator card, after receiving the query operation to be executed, may execute each the query operation according to the data received from other accelerator cards, the data in the accelerator card's own memory, the data in the memory pool, the data in the accelerator card's own storage, the memory pool being generated by each the accelerator card's memory and the host memory of the host according to the cache coherency protocol, after each the accelerator card executes each query operation, each the accelerator card saves some or all of the results of the execution of each query operation, sends them to other accelerator cards, and returns them to the master accelerator card according to actual needs.

Figure 5:
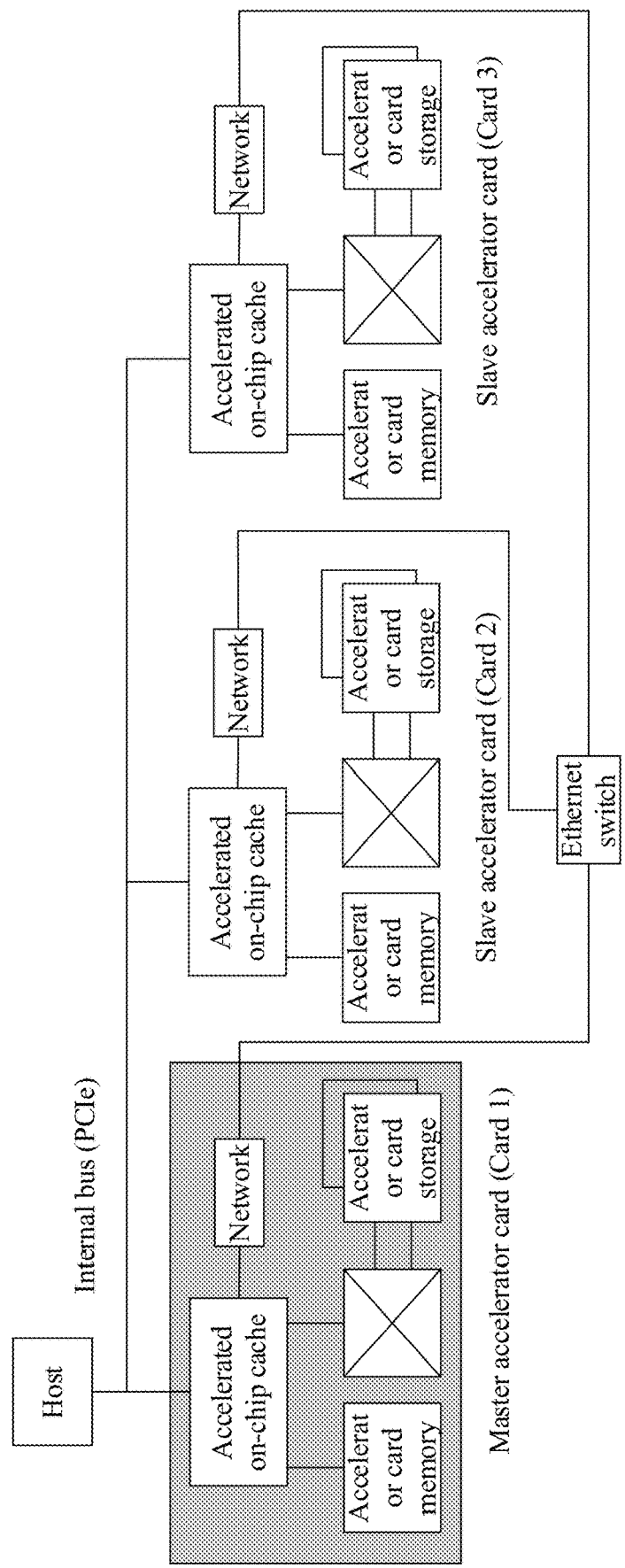
FIG. 5 illustrates a schematic diagram of the architecture of system for hierarchical database operation accelerator including three accelerator cards in embodiments of the present invention.

In the specific application scenario of this application, as shown in FIG. 5, when the slave accelerator card Card2 executes the assigned query operation, it may need to accept the data sent from the master accelerator card Card1 via the bus, or it may need to read the data of this node, or it may read the memory data of the slave accelerator card Card3. After the slave accelerator card Card2 executes, it may need to send a portion of the relevant execution results to the slave accelerator card Card3 via the bus, it also may store some of the results locally, or send the aggregated execution results directly to the slave accelerator card Card1.

In order to improve the reliability of the system, in some embodiments of the present application, each the master accelerator card and the slave accelerator card are connected to each other via a data bus and/or a network interface, each the master accelerator card and slave accelerator card having the capability to encrypt and/or compress, decrypt and/or decompress data.

In this implementation, the network interface includes one or more of Ethernet, FC (Fiber Channel), RoCE (RDMA over Converged Ethernet) v2. In the specific application scenario of this application, as shown in FIG. 5, each the accelerator card is interconnected at high speed through an external Ethernet Switch (Ethernet Switch). It can also be any of the remaining network switching devices supported by the accelerator cards. Further, this network switching device can connect more homogeneous systems or accelerator cards to build larger multi-card systems. The data movement between nodes resulting from data distribution updates can be done directly through a high-speed network interface, or the network interface and internal bus can be done simultaneously.

Figure 6:
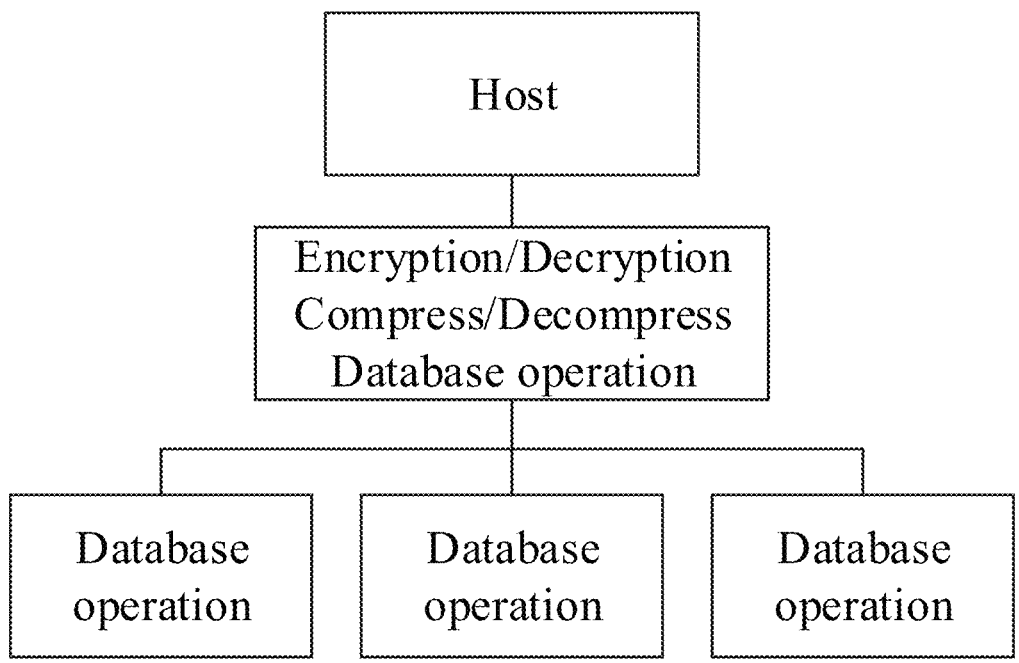
FIG. 6 illustrates a schematic diagram of deploying compression/decompression, encryption/decryption functions on the master accelerator card in an embodiment of the present invention.
Figure 7:
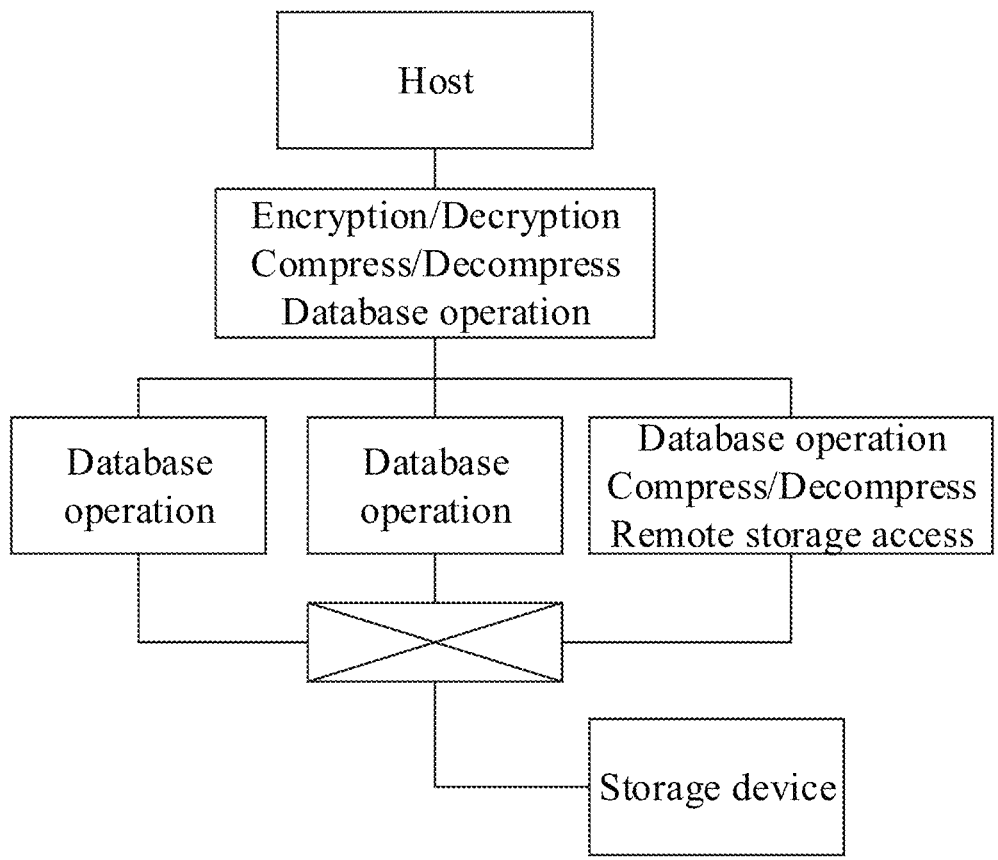
FIG. 7 illustrates a schematic diagram of deploying remote storage access functionality and encryption/decryption functionality on the slave accelerator card in an embodiment of the present invention.

One or more of each accelerator card has the capability to encrypt and/or compress, decrypt and/or decompress the data. In the specific application scenario of this application, as shown in FIG. 6, when the hierarchy accelerator module is enabled and the encrypted and/or compressed database data is loaded from the storage media on the host side, the decompression and/or decryption of the data needs to be completed by the master accelerator card first, and then distributed to each the accelerator card (including the master and the slave accelerator cards). When the result data needs to be persisted on disk, each the slave accelerator card aggregates the execution results to the master accelerator card, and then the master accelerator card completes encryption and/or compression and sends them to the host side for persistent storage. As shown in FIG. 7, the remote storage access function is deployed on a slave accelerator card to support connection to remote storage devices. If the remote storage device stores encrypted data, the slave accelerator card also needs to deploy the encryption/decryption function to complete the support for the remote storage device.

Figure 8:
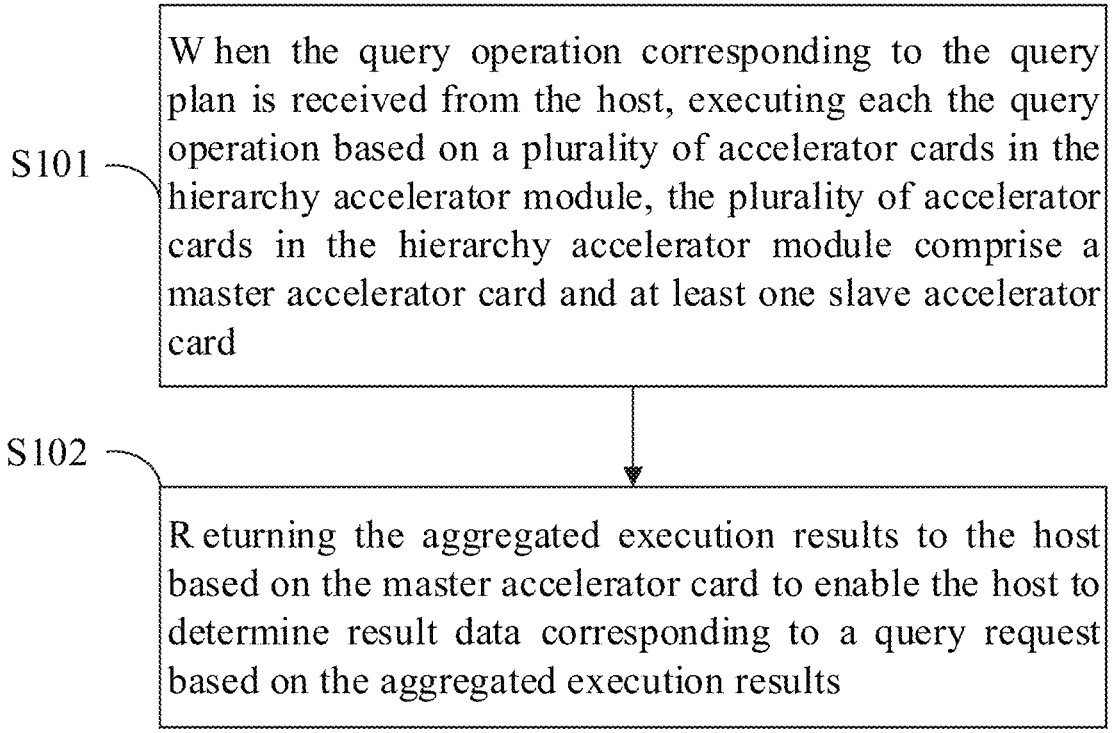
FIG. 8 illustrates a flow diagram of a method for hierarchical database operation accelerator proposed in an embodiment of the present invention.

This application embodiment also presents a method for hierarchical database operation accelerator, as shown in FIG. 8, the method comprises the following steps:

step S101, when the query operation corresponding to the query plan is received from the host, executing each the query operation based on a plurality of accelerator cards in the hierarchy accelerator module, the plurality of accelerator cards in the hierarchy accelerator module comprise a master accelerator card and at least one slave accelerator card.

Step S102, returning the aggregated execution results to the host based on the master accelerator card to enable the host to determine result data corresponding to a query request based on the aggregated execution results.

Wherein, the query plan is generated based on the query request, the query operation comprises a master query operation performed by the master accelerator card and a slave query operation performed by the slave accelerator card, the aggregated execution results being the result of the master accelerator card performing the master query operation based on the execution results of each the slave query operation.

In order to improve the reliability and efficiency of the query operation, in some embodiments of the present application, each the query operation is executed based on a plurality of accelerator cards in the hierarchy accelerator module, specifically:

executing each the query operation based on each the accelerator card according to data received from other accelerator cards, data in the accelerator card's own memory, data in a memory pool, data in the accelerator card's own storage;

saving, sending to other slave accelerator cards, returning to the master accelerator card, based on each the accelerator card, some or all of the execution results of each the query operation;

wherein, the memory pool is generated by each the master accelerator card, the memory of the slave accelerator cards and the host memory of the host in accordance with a cache coherency protocol.

In order to improve the efficiency of the data query, in some embodiments of the present application, the method further comprises:

sending its own notification information to the master accelerator card at a predetermined periodicity based on each the slave accelerator card; and, updating the data distribution among each the accelerator cards according to the notification information based on the master accelerator card;

wherein, the notification information includes the remaining capacity and the content of the stored data of the accelerator card storage, and the hotness and correlation of the respective node data blocks recorded by each the slave accelerator card.

In order to further elaborate the technical ideas of embodiments of the present invention, the technical solutions of embodiments of the present invention are described in the context of specific Application Scenarios.

Application Scenario One

The host receives a query operation from a client, taking Q7 of the test of TPC-H as an example, the sentence SQL is as follows:

```
select supp_nation, cust_nation, 1_yea, sum(volume)as revenue
from (
    select
        n1.n name as sup_nation,
        n2.n name as cust_nation,
        extract(year from l_shipdate) as 1_year,
        l_extendedprice *(1-l_discount) as volume
    from
        supplier, lineitem, orders, customer, nation n1, nation n2
    where
    s_suppkey=l_suppkey
    and o_orderkey=l_orderkey
    and c_custkey =o_custkey
    and s_nationkey=n1.n_nationkey
    and c_nationkey=n2.n_natmonkey
    and(
        (n1.n_name='GERMARY' and n2.n_name='EGYPT')
        or(n1.n_name= 'EGYPT' and n2.n_name='GERMARY')
    )
    and l_shipdate between date '1995-01-01' and date '1996-12-31'
    ) as shipping
group by
    supp_nation, cust_nation, 1_year
order by
supp_nation, cust_nation, 1_year
```

The execution plan output by PostgreSQL is shown in FIG. 9.

Figure 10:
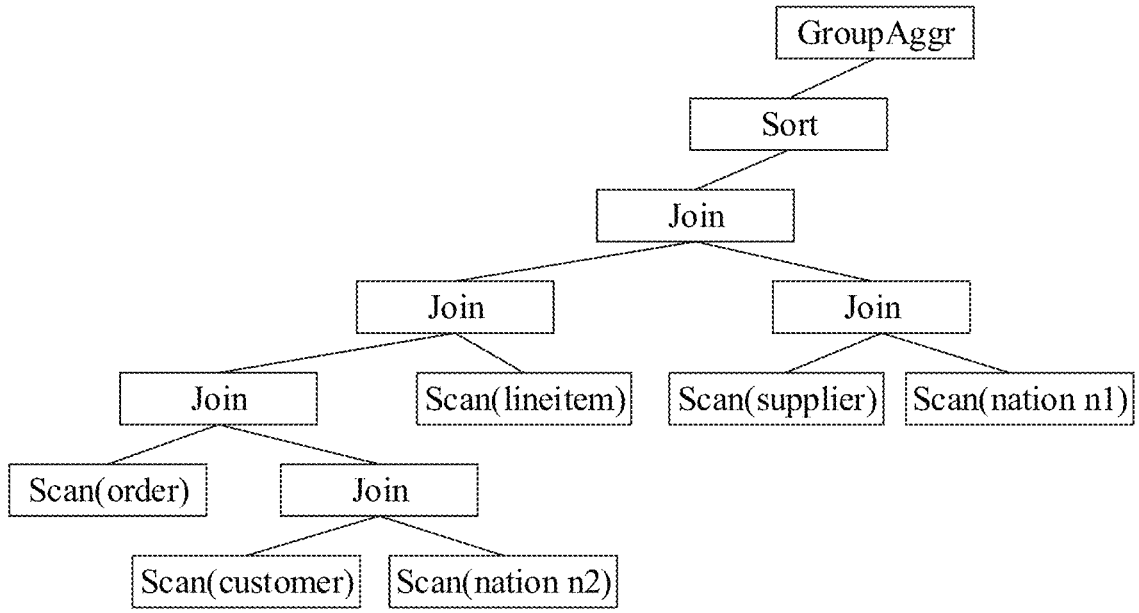
FIG. 10 illustrates a schematic diagram of an execution plan tree corresponding to FIG. 9.

The host transforms the plan tree to match the query operations of the accelerator card and assigns the execution plan tree as shown in FIG. 10 to plurality of accelerator cards based on the execution energy information of the accelerator cards.

Figure 11:
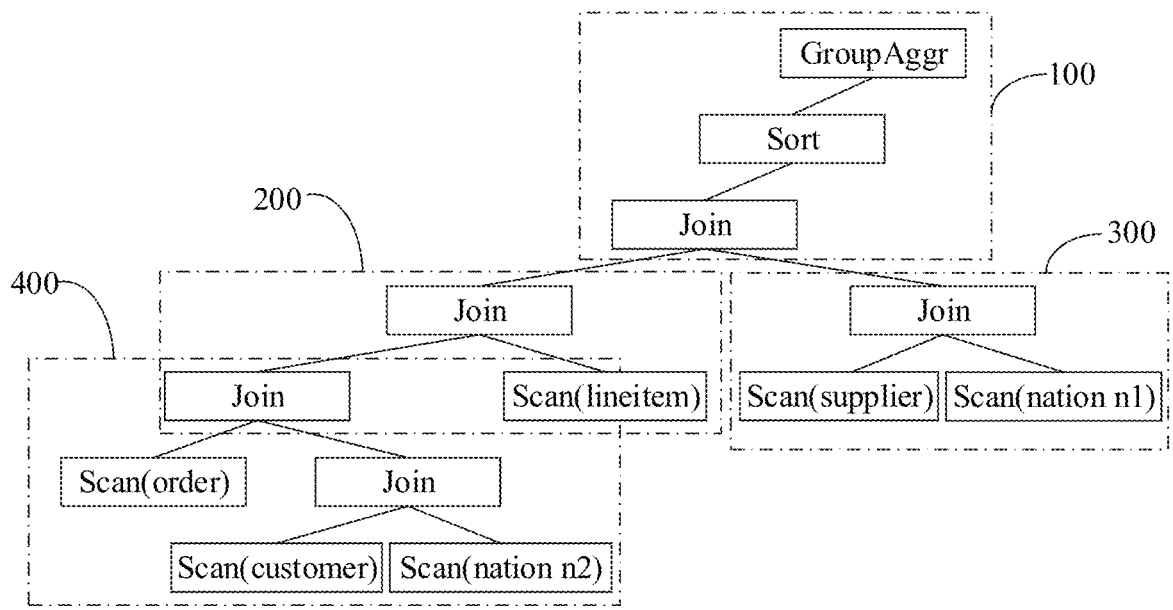
FIG. 11 illustrates a schematic diagram of the assignment of the execution plan tree in FIG. to the respective accelerator cards.

Taking the three-accelerator card system in FIG. 5 as an example, assume that based on the current data distribution information (order, customer, and nation tables are stored in the master accelerator card Card1, Lineitem is stored in the slave accelerator card Card2, supplier is stored in the slave accelerator card Card3, and a copy of nation is also stored in the slave accelerator card Card3) and the execution capabilities of the accelerator cards (each accelerator card can perform scan, join, sort and aggregation operations), the host decomposes the plan tree of FIG. 10 into four parts, as shown in FIG. 11, where the master accelerator card Card1 is assigned to perform the fourth part of the query operation 400, the slave accelerator card Card2 is assigned to perform the second part of the query operation 200, the slave accelerator card Card3 is assigned to perform the third part of the query operation 300, the first part of the final of query operation 100 needs to be re-aggregated to the master accelerator card Card1 to execute, and then the master accelerator card Card1 returns the final result to the host.

It is understood that the fourth part query operation 400 and the first part query operation 100 are master query operations, the second part query operation 200 and the third part query operation 300 are slave query operations, respectively.

Thus, after each the accelerator card receives its respective assigned execution operation, the master accelerator card Card1, the slave accelerator card Card2 and the slave accelerator Card3 all start reading the stored data of their respective home cards and executing their respective scan operations.

After the master accelerator card Card1 performs two more Join connection operations, sends the execution results over the bus to the slave accelerator card Card2, which then starts waiting for the input of its aggregation phase to arrive.

After the slave accelerator card Card2 executes the scan and receives the execution result from the master accelerator card Card1, it starts to execute the join operation and sends the result to the master accelerator card Card1 when the execution is finished.

After the slave accelerator card Card3 executes the scan and the Join connection operation, it sends the result to the master accelerator card.

After receiving the data returned from the slave accelerator card Card2 and the slave accelerator card Card3, the master accelerator card Card1 starts to execute the final operation and returns the result to the host after completion.

Application Scenario Two

The host receives query operations from two clients at the same time, taking Q4 and Q14 of TPC-H's test as an example, the SQL of Q4 is as follows:

```
Select o_orderpriority, count(*) as order_count
From orders
Where
O_orderdate >= date'1993-10-01'
and o_orderdate < date '1993-10-01'+ interval '3' month
and exists(select* from lineitem where l_orderkey = o_orderkey and l_commitdate <
l_receiptdate)
    group by o_orderpriority
    order by o_orderpriority
```

The execution plan output by PostgreSQL is shown in FIG. 12.

The host transforms the execution plan to match the query operations of the accelerator card to get the execution plan tree as shown in FIG. 13.

The SQL of Q14 is as follows:

```
Select
100. 00* sum(case
when p_type like 'PROMO%'
then l_extendedprice *(1-l_discount)
else 0
end)/ sum(l_extendedprice *(1-l_discount)) as promo_ revenue
from
  lineitem, part
where
l_partkey= p_partkey
```

```
and l_shipdate >= date '1993-09-01'
and l_shipdate< date '1993-09-01'+ interval '1' month
```

The execution plan of PostgreSQL output is shown in FIG. 14.

Figure 15:
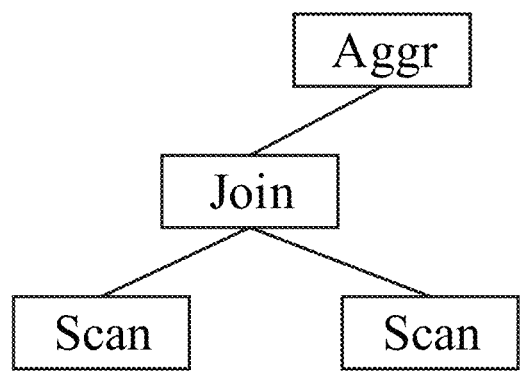
FIG. 15 illustrates a schematic view of the execution plan tree corresponding to FIG. 14.

The host transforms the execution plan into a query operation matching the accelerator cards to obtain the execution plan tree shown in FIG. 15.

Using the three-accelerator card system in FIG. 5 as an example, assuming that the current data distribution information (Part is stored in the slave accelerator card Card2, order is stored in the slave accelerator card Card3, and Lineitem table is stored in a portion of each of the slave accelerator card Card2 and the slave accelerator card Card3) and the execution capability information of the accelerator cards (each accelerator card can perform scan, join, sort, and aggregation operations), the host distributes the plan trees in FIG. 13 and FIG. 15: wherein the slave accelerator Card2 is assigned to execute the plan tree in FIG. 15, and the slave accelerator card Card3 is assigned to execute the plan tree in FIG. 13.

Thus, when each card receives its assigned execution operation, the master accelerator card Card1, the slave accelerator card Card2 and the slave accelerator card Card3 all start preparing to execute their respective operations.

After the slave accelerator card Card2 executes the scan and receives the data from the slave accelerator card Card3 and starts executing the Join operation, after the aggregation is executed, the results are sent to the master accelerator card Card1;

After the slave accelerator card Card3 executes the scan and receives some data from the slave accelerator card Card2, it starts to perform the Join operation and sends the result to the master accelerator card Card1 after sorting and aggregation.

After receiving the data returned from the slave accelerator card Card2 and the slave accelerator card Card3, the master accelerator card Card1 returns the results of both executions to the host.

Although the invention has been illustrated and described in greater detail with reference to the exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A system for hierarchical database operation accelerator, for scaling a single node database with a plurality of accelerator cards, comprising:
a host, in response to receiving a query plan associated with a query request, for generating a corresponding query operation and distributing the corresponding query operation according to the query plan, wherein the host also receives and processes aggregated execution results from the single node database;
a hierarchy accelerator module, which is connected to the host, for receiving the corresponding query operation distributed by the host and returning the aggregated execution results based on the corresponding query operation;
wherein the hierarchy accelerator module comprises a master accelerator card and at least one slave accelerator card, the master accelerator card and the at least one slave accelerator card are interconnected to execute the corresponding query operation and generate execution results;
wherein the at least one slave accelerator card returns the execution results to the master accelerator card;
wherein, the query plan is generated based on the query request, the query operation comprises a master query operation performed by the master accelerator card and a slave query operation performed by the at least one slave accelerator card, and the aggregated execution results being result of the master accelerator card performing the master query operation based on execution results of the slave query operation.

2. The system according to claim 1, wherein the host, the master accelerator card and the at least one slave accelerator card are provided with storage units for storing data, forming a multi-level storage architecture of accelerator chip on-chip cache, accelerator card memory, accelerator card storage, and host-side storage;
wherein the host distributes the query operation corresponding to the query plan to each of the accelerator cards based on data distribution information and execution capability information of each accelerator card, the data distribution information being determined based on the data distribution status between each of the storage units.

3. The system according to claim 2, wherein data is transferred between the accelerator chip on-chip cache, the accelerator card memory, the accelerator card storage, and the host-side storage in accordance with predetermined cache rules.

4. The system according to claim 2, wherein the at least one slave accelerator card sends notification information to the master accelerator card at a predetermined periodicity, the master accelerator card updating the data distribution among the accelerator cards based on the notification information;
wherein, the notification information includes a remaining capacity of the accelerator card memory and a content of the stored data, as well as a hotness and correlation of respective node data blocks recorded by the at least one slave accelerator card.

5. The system according to claim 1, wherein the master accelerator card is selected according to predetermined rules,
wherein the master accelerator card, the at least one slave accelerator card and the host being connected to each other according to predetermined physical interface specifications.

6. The system according to claim 1, wherein the at least one slave accelerator card performs each of the query operations based on data received from other slave accelerator cards, data in a memory of the at least one slave accelerator card, and data in a memory pool, data in a storage of the at least one slave accelerator card;
the at least one slave accelerator card saving, sending to the other slave accelerator cards, and returning to the master accelerator card, some or all of the execution results of each of the query operation;
wherein, the memory pool is generated from each of the slave accelerator card memory and a host memory of the host in accordance with a cache coherency protocol.

7. The system according to claim 1, wherein the master accelerator card and the at least one slave accelerator card are connected to each other via a data bus and/or a network interface, the master accelerator card and the at least one slave accelerator card having the capability to encrypt and/or compress, decrypt and/or decompress data.

8. A method for hierarchical database operation accelerator, for scaling a single node database with a plurality of accelerator cards, wherein the method comprises:
receiving, by a host, a query plan;
when a query operation corresponding to the query plan is received from the host by a hierarchy accelerator module, executing the query operation based on the plurality of accelerator cards in the hierarchy accelerator module, wherein the plurality of accelerator cards in the hierarchy accelerator module comprise a master accelerator card and at least one slave accelerator card;
returning aggregated execution results to the host, by the master accelerator card to enable the host to determine result data corresponding to a query request based on the aggregated execution results from the single node database;
wherein, the query plan is generated based on the query request, the query operation comprises a master query operation performed by the master accelerator card and a slave query operation performed by the at least one slave accelerator card, and the aggregated execution results being a result of the master accelerator card performing the master query operation based on execution results of the slave query operation.

9. The method according to claim 8, wherein the query operation is executed based on the plurality of accelerator cards in the hierarchy accelerator module according to data received from other accelerator cards, data in memories of the plurality of accelerator cards, data in a memory pool, and data in storages of the plurality of accelerator cards;
saving, sending to other slave accelerator cards, returning to the master accelerator card, based on each of the other slave accelerator cards, some or all of execution results of the query operation;
wherein, the memory pool is generated by the master accelerator card, a memory of the at least one slave accelerator card and a host memory of the host in accordance with a cache coherency protocol.

10. The method according to claim 9, wherein the method further comprises:
sending notification information to the master accelerator card at a predetermined periodicity based on the at least one slave accelerator card; and, updating the data distribution among the plurality of accelerator cards according to the notification information based on the master accelerator card;
wherein, the notification information includes a remaining capacity and a content of the stored data of the accelerator card storages, and a hotness and correlation of respective node data blocks recorded by the at least one slave accelerator card.

\* \* \* \* \*